(12) United States Patent
Dam

(10) Patent No.: US 10,184,047 B2
(45) Date of Patent: Jan. 22, 2019

(54) METHOD FOR MANUFACTURING A REFLECTIVE MATERIAL, HELMET, REFLECTOR AND USE THEREOF

(71) Applicant: Codan B.V., Rockanje (NL)

(72) Inventor: Robert Hilbrand Nicolaas Dam, Rockanje (NL)

(73) Assignee: Codan B.V., Rockanje (NL)

( * ) Notice: Subject to any disclaimer, the term of this patent is extended or adjusted under 35 U.S.C. 154(b) by 0 days.

(21) Appl. No.: 14/915,385

(22) PCT Filed: Aug. 27, 2014

(86) PCT No.: PCT/NL2014/050583
§ 371 (c)(1),
(2) Date: Feb. 29, 2016

(87) PCT Pub. No.: WO2015/030587
PCT Pub. Date: Mar. 5, 2015

(65) Prior Publication Data
US 2016/0208108 A1    Jul. 21, 2016

(30) Foreign Application Priority Data
Aug. 28, 2013 (NL) ........................ 2011351

(51) Int. Cl.
*C09D 5/33* (2006.01)
*A42B 3/04* (2006.01)
*C09J 201/00* (2006.01)
*A42B 3/06* (2006.01)

(52) U.S. Cl.
CPC ............. *C09D 5/004* (2013.01); *A42B 3/04* (2013.01); *C09J 201/00* (2013.01); *A42B 3/061* (2013.01)

(58) Field of Classification Search
None
See application file for complete search history.

(56) References Cited

U.S. PATENT DOCUMENTS

| 3,558,387 | A |   | 1/1971 | Bassemir et al. |
| 4,737,553 | A | * | 4/1988 | Gannon ............... C08G 59/066 525/481 |
| 5,110,655 | A |   | 5/1992 | Engler et al. |
| 5,959,775 | A | * | 9/1999 | Joseph .................. C08G 18/10 359/536 |
| 2001/0017731 | A1 | * | 8/2001 | Smith .................... G02B 5/124 359/530 |

(Continued)

FOREIGN PATENT DOCUMENTS

EP       0481634 A1    4/1992
WO    2011136642 A1   11/2011

*Primary Examiner* — Shamim Ahmed
*Assistant Examiner* — Bradford M Gates
(74) *Attorney, Agent, or Firm* — The Webb Law Firm

(57) ABSTRACT

The present invention relates to a method for manufacturing and/or treating thermally deformable reflective material, including steps for: providing a base material such as a plate material or a sheet material, arranging on the base material an adhesive layer in the form of a polymerizable monomer mixture, preferably a photoactivatable monomer mixture, positioning reflective particles on the monomer mixture, subjecting the monomer mixture to a curing process for providing a thermoplastic polymer mixture for the purpose of fixing the reflective particles relative to the base material.

20 Claims, 2 Drawing Sheets

(56) References Cited

U.S. PATENT DOCUMENTS

| | | | |
|---|---|---|---|
| 2007/0157953 A1* | 7/2007 | Mandi | B29C 66/02 134/42 |
| 2007/0209393 A1* | 9/2007 | Miller | B29D 11/0073 65/17.6 |
| 2011/0290179 A1* | 12/2011 | Stowell | B41J 11/002 118/642 |
| 2017/0092814 A1* | 3/2017 | Chien | H01L 33/44 |

* cited by examiner

METHOD FOR MANUFACTURING A REFLECTIVE MATERIAL, HELMET, REFLECTOR AND USE THEREOF

CROSS-REFERENCE TO RELATED APPLICATIONS

This application is the United States national phase of International Application No. PCT/NL2014/050583 filed Aug. 27, 2014, and claims priority to Netherlands Patent Application No. 2011351 filed Aug. 28, 2013, the disclosures of which are hereby incorporated in their entirety by reference.

BACKGROUND OF THE INVENTION

Field of the Invention

The present invention relates to a method for manufacturing and/or treating thermally deformable reflective material. The present invention also relates to a semi-finished product of reflective material manufactured by applying a method according to the present invention. The present invention also relates to a helmet manufactured using reflective material manufactured by applying the method according to the present invention. The present invention further relates to a reflector manufactured using reflective material manufactured by applying the present invention. The present invention also relates to a use of substantially monomer mixture, such a substance or such a composition according to the present invention and substance or compositions resulting therefrom as adhesive, preferably as thermoplastic adhesive.

Description of Related Art

It is very important, for instance in road traffic, for a good reflection to be provided for the purpose of visibility. A passive visibility is important on stationary traffic-related objects such as street furniture as well as on moving vehicles.

It is known to apply glass particles to surfaces in order to provide reflection. An advantage of such particles is that they reflect very well, although a drawback is that they are very difficult to fix in reliable manner. Attempts have for instance been made to apply glass particles from a mixture of glass particles and glue to a plate material, but the reflective capability of the resulting product is mediocre because the influence of the glue on the glass particles greatly reduces the reflective capability.

SUMMARY OF THE INVENTION

In order to improve this known practice the present invention provides a method for manufacturing and/or treating thermally deformable reflective material, comprising steps for:
  providing a base material such as a plate material or a sheet material,
  arranging on the base material an adhesive layer in the form of a monomer mixture, preferably a photoactivatable monomer mixture,
  positioning reflective particles on the monomer mixture,
  subjecting the monomer mixture to a curing process for providing a thermoplastic mixture for the purpose of fixing the reflective particles relative to the base material.

An advantage of a reflective material manufactured by applying a method according to the present invention is that a very good reflection is obtained due to the arrangement of the reflective material on the adhesive layer whereby reflective surfaces of the reflective material are exposed. A further advantage of a material according to the present invention is that a durable adhesion is realized between the reflective particles and the base material.

A further advantage of a reflective material and manufactured by applying a method according to the present invention is that a reflective material is provided which, following initial production, can be further shaped or deformed under the influence of a heat treatment, wherein substantially the relative orientation between the base material and the reflective particles is retained because, under the influence of a suitable temperature for deforming the base material, the thermoplastic polymer mixture can co-deform. A durable reflective material is thus provided which is also readily processable.

The present inventors have obtained this result following years of experimentation with many types of glue instead of the monomer mixture resulting in a thermoplastic polymer mixture. Many forms of glue caused limitations to the reflectivity of the reflective particles and, using the previously applied thermosetting materials, the reflective particles displaced relative to the base material during later processing of the reflective material.

In a first preferred embodiment according to the present invention the steps in the method for subjecting the monomer mixture to a curing process comprise steps for polymerizing the monomer mixture, wherein the monomer mixture is a polymerizable monomer mixture. A thermoplastic is hereby obtained comprising a polymer from the original monomer mixture. This has the advantage that properties of the thermoplastic can be determined by the properties of the original monomer mixture. The thermoplastic properties can for instance be realized by applying a monomer which is suitable for providing two-dimensional cross-linking long chains.

In a further preferred embodiment the steps of subjecting the monomer mixture to a curing process comprise steps for photoactivating the monomer mixture, wherein the monomer mixture is provided with an effective quantity of at least a photoinitiator, such as preferably aryl ketones. A way of initiating polymerization of a monomer mixture is hereby provided which can be realized by means of a relatively advantageous production means, such as a light source.

The method more preferably comprises steps for applying a light source for generating light at a wavelength of between 220 nm and 480 nm, preferably between 280 nm and 400 nm, more preferably at a wavelength at some interval falling within these values, more preferably by means of for instance a UVIRA LD 395 light source. Steps in the method for subjecting the monomer mixture to a curing process more preferably comprise steps for applying a so-called cold light source. Such production means are readily available and provide good results in an easily manageable production process.

In a further preferred embodiment the steps for positioning the reflective particles on the monomer mixture comprise steps for positioning a carrier material, such as a film material, with reflective particles arranged thereon on the monomer mixture in a manner such that the reflective particles come into contact with the monomer mixture. Such a carrier material is advantageous for the purpose of arranging the reflective particles on the monomer mixture in a good mutual arrangement, i.e. a uniform distribution. An efficient production process can hereby be realized in the form of a continuous process or automated batch process.

The base material more preferably comprises a preferably transparent polymer, preferably a thermoplastic, more preferably a polycarbonate, a styrene acrylonitrile, a PETG. Using such base materials many forms of reflective product can be manufactured such as helmets, such as motorcycle helmets, or reflective surfaces to be arranged on vehicles.

The base material more preferably comprises a textile, the base material comprises an elastomer foam or the base material comprises a thermosetter. A reflective material is therefore hereby realized wherein use can be made in advantageous manner of the properties of these base materials, and wherein a good adhesion is also realized between the reflective particles and these base materials.

The refractive index of the reflective particles is preferably higher than 1, preferably higher than 1.5, preferably higher than 1.8, preferably higher than 2.

In a further preferred embodiment the monomer mixture is a two-component mixture, preferably with a peroxide as radical initiator, and the method comprises steps for polymerization under the influence of the second component, preferably by applying a treatment by means of infrared radiation. An adhesive layer is hereby provided in an alternative manner for the purpose of obtaining a reflective material according to the present invention. An advantage of a two-component product is that the separate components can have a relatively long storage life.

By applying a monomer mixture comprising unsaturated monomers, preferably with an unsaturated group at or close to the outer end thereof, a thermoplastic is realized which by means of two-dimensional cross-linking long chains, within the context of the present invention, is deformable with the base material in a manner that the distribution of the reflective particles is retained on the surface of the base material. In other words, islet formation by the reflective particles during deformation of a base material is prevented following arranging of the reflective particles.

In a further preferred embodiment the monomer mixture comprises acrylates, methacrylates, vinyl esters, vinyl ethers, more preferably mercaptans, such as comprising thiolene systems or cationic curing systems. The monomer mixture more preferably comprises adhesion promoters for enhancing adhesion of the reflective material.

In a further preferred embodiment the steps for subjecting the monomer mixture to a curing process comprise steps for applying electron beams for electron activation of the monomer mixture, wherein the electron beam preferably impinges directly on the monomer mixture. An advantage of such a preferred embodiment is that a base material which is relatively impermeable to light can be applied.

The steps for subjecting the monomer mixture to a curing process more preferably comprise steps for applying a radio-frequency drying, such as preferably by means of microwave radiation, for the purpose of curing the monomer mixture. Such an embodiment has similar advantages to the previous embodiment.

A further preferred embodiment comprises steps for bringing an initially substantially flat reflective material according to one or more of the foregoing claims into a predetermined shape, comprising steps for:
heating previously manufactured reflective material to a predetermined processing temperature,
mechanically deforming the reflective material to the predetermined shape,
allowing the reflective material to cool to an ambient temperature. By means of these processing steps reflective material according to the present invention can be brought from for instance a flat form to for instance substantially a part of a spherical shape, for instance for a helmet. It is however likewise possible to manufacture diverse preformable shapes from the reflective material manufactured according to the present invention.

The steps for mechanical deformation more preferably comprise steps here for deforming the reflective material under the influence of a vacuum force.

A further aspect according to the present invention relates to a semi-finished product of reflective material manufactured by applying a method according to one or more of the foregoing claims. Such a semi-finished product can for instance be stored and transported in advantageous manner on a roll. Envisaged in alternative manner is that stacks of flat sheets of reflective material can be realized.

A further aspect according to the present invention relates to a helmet manufactured using reflective material manufactured by applying a method according to the present invention.

A further aspect according to the present invention relates to a reflector which is manufactured using reflective material manufactured by applying a method according to the present invention.

A further aspect according to the present invention relates to a use of a substantially monomer mixture, such a substance or such a composition as defined and/or treated, and/or a substance or composition resulting therefrom by applying a method according to one or more of the foregoing claims as an adhesive, preferably as a thermoplastic adhesive.

It is the case here that the substantially monomer mixture or a composition of substantially monomers as applied according to the present invention has a filling weight of 50-400, more preferably 100-300. According to the present invention a mixture or composition preferably comprises a very small quantity of or no prepolymers with a molecular weight of 500-1000 or higher, at least to the extent such prepolymers result in less ideal thermoplastic properties or properties of a thermosetter or for instance three-dimensional cross-linked structures.

After the curing process a thermoplastic mixture more preferably comprises molecules with a molecular weight above 1000, more preferably above 1500, more preferably above 2000, more preferably above 2500, more preferably above 3000, more preferably above 3500, more preferably above 4000, more preferably above 10,000, more preferably above 20,000, more preferably above 30,000.

Mixtures on the basis of monomers and polymers are per se known in applications such as lacquers or thermosetters and are hereby unsuitable for applications according to the present invention.

BRIEF DESCRIPTION OF THE DRAWINGS

Further advantages, features and details of the present invention will be described in greater detail hereinbelow on the basis of one or more preferred embodiments with reference to the accompanying figures. Similar though not necessarily identical components of different preferred embodiments are designated with the same reference numerals.

DETAILED DESCRIPTION OF THE INVENTION

Figure 1:
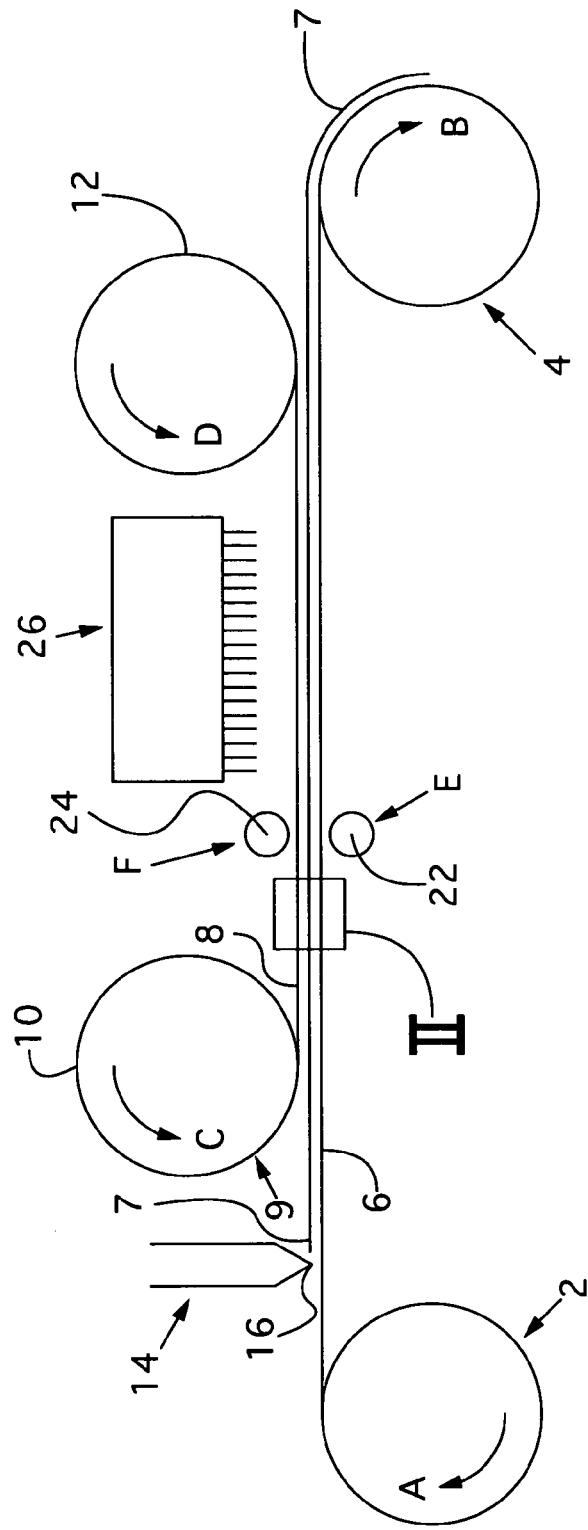
FIG. 1 shows a schematic representation of a first preferred embodiment of a processing of a base material for the purpose of manufacturing a reflective material according to the present invention.
Figure 2:
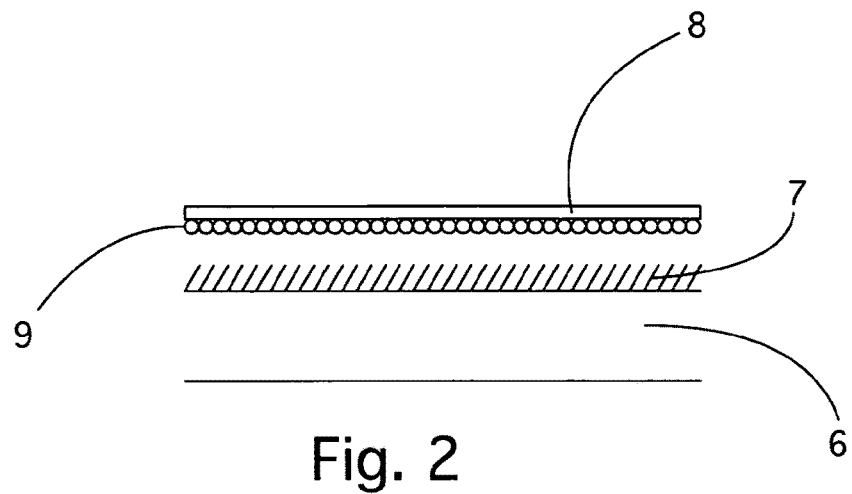
FIG. 2 shows a schematic representation of a base material, adhesive layer, reflective particles and application film in accordance with a preferred embodiment according to the present invention.

In accordance with a preferred embodiment according to the present invention a base material 6 coming from a supply roll 2 is processed in a manner such that a reflective material is realized which is carried onto a roll 4.

The base material is preferably a plastic which is to some extent transparent, preferably a thermoplastic. Materials provided according to the present invention comprise polycarbonate, styrene acrylonitrile, PET, PETG and so on. The base material is unrolled from roll 2 in the direction of arrow A. The end product is rolled up onto roll 4 in the direction of arrow B. In addition to the base material, the end product comprises an adhesive layer 7 and a layer of reflective particles 9 arranged thereon.

Reflective particles 9 are supplied on a film coming from a roll 10 in the direction of arrow C, on which film the reflective particles have been prearranged by means of a temporary adhesion. After the reflective particles have been released from the film, the film is rolled up onto roll 12 in the direction of arrow D.

After the base material has been unrolled from roll 2, the base material is carried past a spray device 14 with a nozzle 16. An adhesive layer 7 is applied to the base material by means of spray nozzle 16. Film 8 with the reflective particles 9 is then carried against adhesive layer 7 from above. Rollers 22, 24 apply a light pressure in the direction of respective arrows E, F for the purpose of pressing the reflective particles against and/or partially into the adhesive layer.

Light sources in illuminating unit 26 provide an illumination of the assembly of the base material, the adhesive layer, the reflective particles and the film fed through thereunder. The illumination initiates curing, such as by means of a polymerization reaction, in the adhesive layer, whereby the reflective particles are attached by means of the adhesive layer to the base material. This shown arrangement on the upper side is recommended when the film is permeable to light of the wavelength used. The illuminating unit is alternatively arranged under the base material. This alternative arrangements on the underside is recommended when the base material is permeable to light of the wavelength used.

The photoinitiators used, such as aryl ketones, absorb light of a short wavelength, whereby radicals are cleaved which initiate the polymerization reaction.

A further shaping process of the reflective material according to the present invention is performed by forming the reflective material up to temperatures between 80 and 300° C., preferably between 120 and 200° C., preferably at about 140 to 160° C., more preferably at about 150° C., which can be realized by applying heating air up to 500°.

An example of a monomer mixture for forming the adhesive layer is a photoactive monomer mixture such as for instance supplied under the brand name Flashcure 640 by the company Parvus BV. The wavelength used is preferably an ultraviolet wavelength between 220 nm and 480 nm, preferably between 280 nm and 400 nm.

A further aspect of the invention relates to a method for manufacturing and/or treating thermally deformable reflective material, comprising steps for:
providing a base material such as a plate material or a sheet material,
arranging an adhesive layer on the base material by means of a deposition step such as a screen-printing step,
positioning reflective particles on the adhesive layer,
arranging a cover plate for the purpose of forming a covering for the reflective particles and the base material, and
mutually fixing the base material and the cover plate, such as by means of welding or an adhesive.

An advantage of this method is that the reflective particles on the side protruding from the adhesive layer can remain free of adhesive and are also arranged durably in the adhesive layer in that they are protected by the cover plate from outside influences such as chafing, scraping, bumping and so on. It is envisaged here that the adhesive layer need have less strong adhesive properties than without the cover plate of an above described aspect according to the present invention.

An important aspect is that the combination of adhesive layer and cover layer substantially does not change the refractive index of the visible surface of the reflective particles. This was also a point of departure in the above described aspects according to the invention and an important advantage which distinguishes the invention from the prior art, wherein embedded reflective particles lose a significant part of their reflective capacity because the refractive index changes.

It is likewise envisaged by the present inventor that such a cover plate is applied in the above described aspect with the polymerizable, substantially monomer mixture, preferably a photoactivatable monomer mixture, and all further stated measures separately and individually.

The arranging of the reflective particles takes place in both cases with the same type of device while applying a device as described in the foregoing. Further measures as described in the foregoing can also be applied in combination with this aspect according to the present invention.

It is particularly envisaged that it is advantageous to apply the adhesive layer with an applicator device such as a screen-printing machine. A particular advantage here is that adhesive material for the adhesive layer can be positioned very precisely.

A further preferred embodiment according to the present invention provides steps for applying the adhesive layer in a pattern. This achieves that the reflective particles can be arranged in this pattern so that for instance reflective stars or circles can be realized.

Preferably applied as base material in both aspects is polycarbonate or Pet-G which have individual advantages in the reflective plate market or the helmet market. A combination of a base material with a cover plate of other material is envisaged subject to the mutual fixation method applied. A preferred method here is a thermal mutual fixation such as by means of welding. Another method envisaged is glueing.

Figure 3:
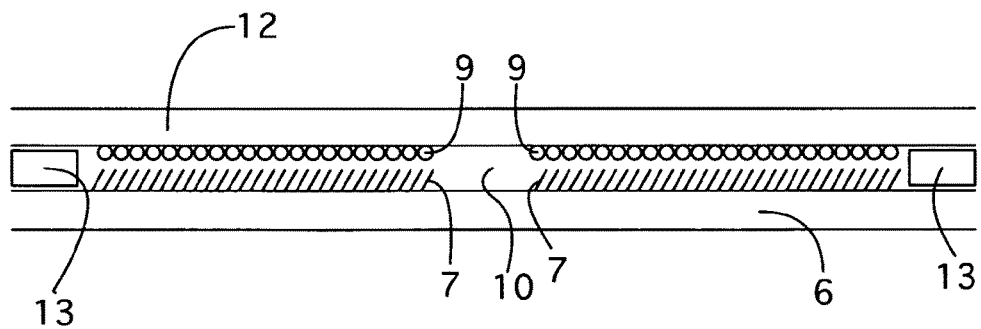
FIG. 3 shows a ready to use assembly according to a second aspect of the present invention.

FIG. 3 shows a ready to use assembly according to the second aspect of the present invention. An adhesive layer 7 is applied to the base material. A number of reflective particles are arranged on this adhesive layer. Also shown is an adhesive layer-free zone 10 which is realized by means of a local deposition of the adhesive layer, in this case a screen-printing process.

Arranged above the reflective particles and the free zone is a cover plate 12 for covering the reflective particles, for instance to prevent them coming loose. The base material and the cover plate are in this case mutually fixed by means of adhesive material 13 arranged in stipples or dots. Envisaged as alternative is a welding process, optionally leaving a welding material behind.

The present invention has been described in the foregoing on the basis of several preferred embodiments. Different aspects of different embodiments are deemed described in combination with each other, wherein all combinations which can be deemed by a skilled person in the field as falling within the scope of the invention on the basis of reading of this document are included. These preferred embodiments are not limitative for the scope of protection of this document. The rights sought are defined in the appended claims.

The invention claimed is:

1. A method of manufacturing a helmet from a thermally deformable reflective material being mechanically deformable to a predetermined shape, the method comprising:
   providing a base material,
   arranging on the base material an adhesive layer in the form of a polymerizable, substantially monomer mixture,
   positioning reflective particles on the monomer mixture, such that at least a portion of the reflective particles partially protrude from the adhesive layer,
   subjecting the monomer mixture to a curing process for providing a thermoplastic mixture for fixing the reflective particles relative to the base material, thereby obtaining a reflective material in which a relative orientation between the base material and the reflective particles is substantially retained during shaping or deforming due to a co-deformable nature of the thermoplastic mixture, and
   shaping or deforming the reflective material to a helmet shape,
   wherein the relative orientation between the base material and the reflective particles is substantially retained during the shaping or deforming.

2. The method as claimed in claim 1, wherein the steps for subjecting the monomer mixture to a curing process comprise steps for polymerizing the monomer mixture.

3. The method as claimed in claim 1, wherein the steps for subjecting the monomer mixture to a curing process comprise steps for photoactivating the monomer mixture, wherein the monomer mixture is provided with an effective quantity of at least a photoinitiator.

4. The method as claimed in claim 3, comprising steps for applying a light source for generating light at a wavelength of between 220 nm and 480 nm.

5. The method as claimed in claim 1, wherein the steps for subjecting the monomer mixture to a curing process comprise steps for applying a cold light source.

6. The method as claimed in claim 1, wherein the steps for positioning the reflective particles on the monomer mixture comprise steps for positioning a carrier material with reflective particles arranged thereon on the monomer mixture in a manner such that the reflective particles come into contact with the monomer mixture.

7. The method as claimed in claim 1, wherein the base material comprises a transparent polymer.

8. The method as claimed in claim 1, wherein the base material comprises a textile, an elastomer, or a thermosetter.

9. The method as claimed in claim 1, wherein the reflective particles have a refractive index which is higher than 1.

10. The method as claimed in claim 1, wherein the monomer mixture comprises a two-component mixture and the method comprises steps for polymerization under the influence of the second component.

11. The method as claimed in claim 1, wherein the monomer mixture comprises unsaturated monomers.

12. The method as claimed in claim 1, wherein the monomer mixture comprises acrylates, methacrylates, vinyl esters, vinyl ethers, and/or mercaptans.

13. The method as claimed in claim 1, wherein the monomer mixture forms two-dimensional cross-linking chains.

14. The method as claimed in claim 1, wherein the monomer mixture comprises adhesion promoters for enhancing adhesion of the reflective material.

15. The method as claimed in claim 1, wherein the steps for subjecting the monomer mixture to a curing process comprise steps for applying electron beams for electron activation of the monomer mixture, wherein the monomer mixture is provided with an effective quantity of an initiator suitable for this purpose.

16. The method as claimed in claim 1, wherein the steps for subjecting the monomer mixture to a curing process comprise steps for applying a radio-frequency drying for the purpose of curing the monomer mixture.

17. The method as claimed in claim 1, comprising steps for bringing an initially substantially flat reflective material into a predetermined shape, comprising steps for:
   heating the reflective material to a predetermined processing temperature,
   mechanically deforming the reflective material to the predetermined shape, and
   allowing the reflective material to cool to an ambient temperature.

18. The method as claimed in claim 17, wherein the steps for mechanical deformation comprise steps for deforming the reflective material under the influence of a vacuum force.

19. The method as claimed in claim 1, further comprising the step of arranging a cover plate to provide a cover for the reflective particles and the base material.

20. The method as claim in claim 19, further comprising the step of fixing the base material and the cover plate by welding or application of an adhesive.

* * * * *